United States Patent [19]

Landsness

[11] 4,279,683
[45] Jul. 21, 1981

[54] TIRE BUILDING MACHINE
[75] Inventor: Clifford A. Landsness, Akron, Ohio
[73] Assignee: The B. F. Goodrich Company, Akron, Ohio
[21] Appl. No.: 88,314
[22] Filed: Oct. 25, 1979
[51] Int. Cl.³ .............................................. B29H 17/20
[52] U.S. Cl. ................................... 156/397; 156/130; 156/405 R; 156/495
[58] Field of Search ............... 156/130, 117, 184, 185, 156/187, 189, 195, 397, 405 R, 494, 495; 264/210.1, 210.7, 214

[56] References Cited

U.S. PATENT DOCUMENTS

| | | | |
|---|---|---|---|
| 3,002,770 | 10/1961 | Chesnut et al. | 156/187 |
| 3,223,572 | 12/1965 | Holloway et al. | 156/130 |
| 3,251,722 | 5/1966 | Holman | 156/130 |
| 3,485,912 | 12/1969 | Schrenk et al. | 264/210.1 |
| 3,523,854 | 8/1970 | Cantarutti | 156/397 |
| 3,907,019 | 9/1975 | Montagne | 156/130 |
| 4,155,789 | 5/1979 | Wireman et al. | 156/130 |

Primary Examiner—John E. Kittle
Attorney, Agent, or Firm—Joseph Januszkiewicz; Michael J. Colitz, Jr.

[57] ABSTRACT

Improved method and apparatus for winding tread stock onto a tire by stretching the relatively thin strip of vulcanizable strip as it is being applied to a rotating tire wherein the windings of the strip overlap each other in a stretched condition to provide a uniform contour at any cross section of the tire eliminating air pockets and enhances bonding of the adjacent and overlying stock.

3 Claims, 6 Drawing Figures

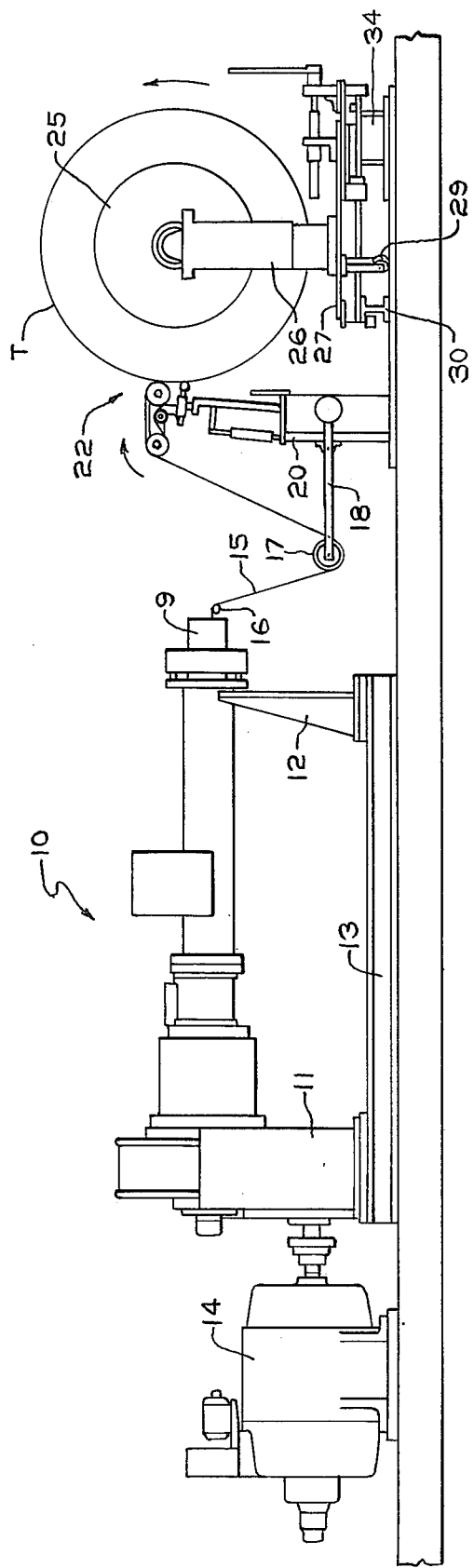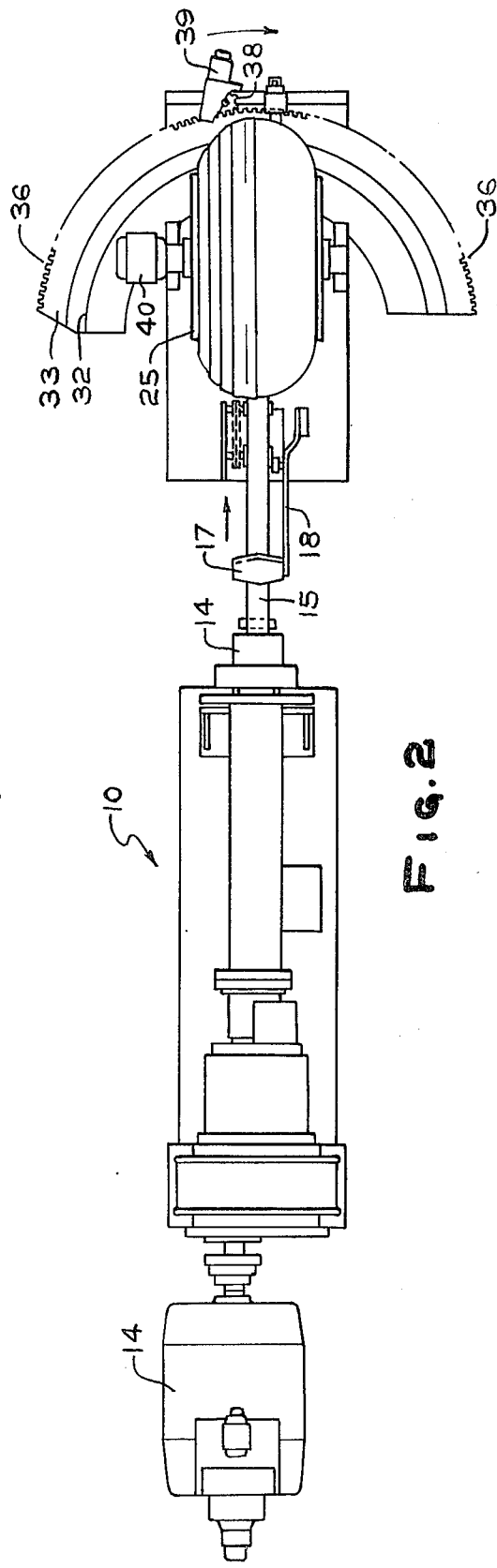

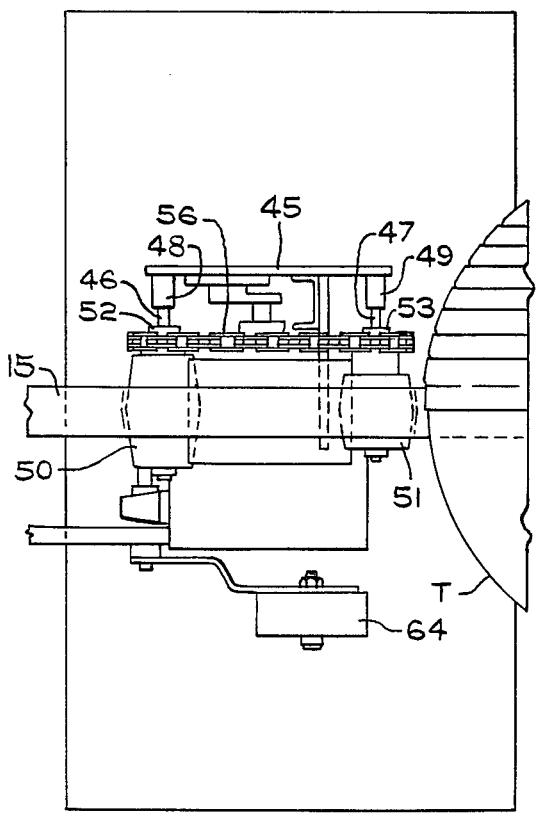
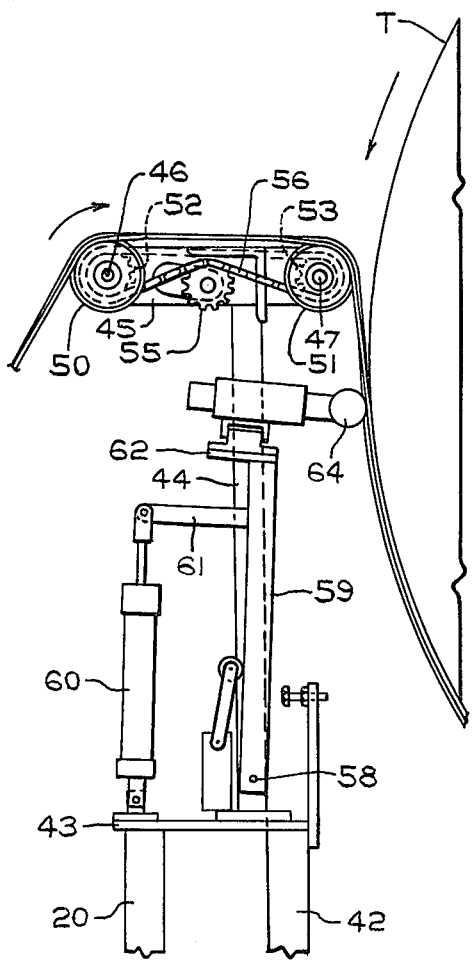
FIG.3
FIG.4
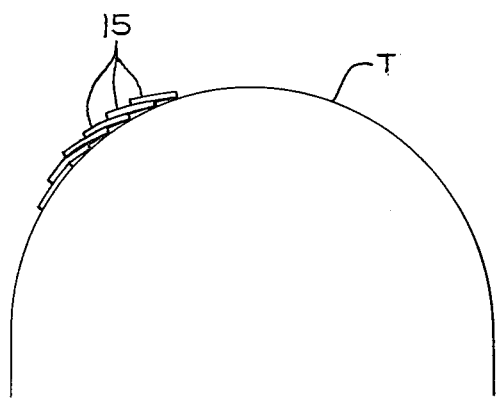
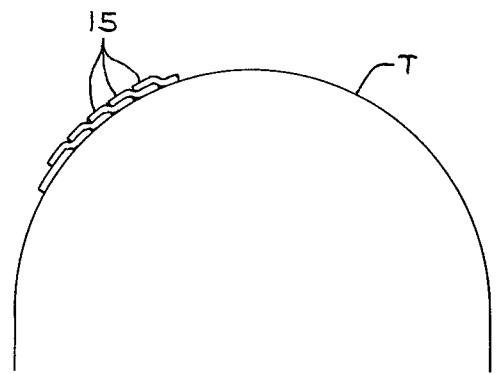
FIG.5
FIG.6

TIRE BUILDING MACHINE

BACKGROUND OF THE INVENTION

This invention relates to the manufacture of a pneumatic tire and more particularly to the building of a non-spliced tread into a shaped tire carcass preparator to the molding of the tire into a finished shape.

In the manufacture of pneumatic tires there are several methods used in the construction of tires. One uses the so-called single machine station where a highly-skilled tire builder builds the entire carcass from pieces of unvulcanized material. In such manufacture successive plies are wrapped around a rotatable drum having a liner thereon. Beads are placed on the respective ends of the drum during this process. In addition, chafer strips, breakers and other strips of material are wound around the carcass. The last step consists of applying a precut length of tread cushion onto the unvulcanized materials on the drum and rotating the drum one revolution to wrap the tread stock on the drum. The mating portions of the splice of such tread stock can present problems in weight distribution of the stock as where the stock must be stretched to be spliced or where the tread stock is pulled excessively during the wrapping so that the proposed mating ends which are to be spliced overlap each other. In this instance, the operator will peel back part of the length of tread stock and crowd the tread stock so that the ends thereof will meet in a closed butt splice. This results in a variation in the wall thickness of the tread stock circumferentially of the tire. In some instances, sidewalls, chafer strips and other parts of the tire are added after the tread stock is applied. The tire carcass is then shaped and cured. Other methods of manufacture include a two-stage process wherein the tire carcass is built on a tire drum but shaped in a second step machine where the slab of tread stock is applied. Variations in these processes are numerous. The present invention is primarily concerned with the application of the tread to the green tire being built. The present invention is directed to the applying of a relatively thin strip of tread stock helically around the drum in lieu of a single wrap, with the number of revolutions and overlap being determined by the desired contour of the tread stock and sidewalls if such sidewall is also to be included in the contour to be wound. Such helical winding of the stock permits an even, controlled distribution of the stock, wherein the thickness of each layer of built-up stock is uniform circumferentially of the tire. Such winding of the strip material facilitates the escape of air from the windings and eliminates trapped air pockets. The improved strip winding of the present invention permits a greater degree of control on the overlapping of the strips and in the continuous winding of the helical strip.

SUMMARY OF THE INVENTION

The present invention is directed to a new and improved method and apparatus for the manufacture of tires wherein the tread stock or tread and sidewall stock is formed by winding a relatively thin strip of vulcanizable material helically around a green tire carcass to the desired contour of the tread (or tread and sidewall) and wherein the windings overlap each other in a stretched condition to provide a carcass with a uniform contour at any cross-section of the circumference of the carcass. With the strip stock being tensioned and stretched in contrast to mere tensioning as it is wound eliminates air pockets and enhances the bonding of the adjacent and overlying stock to form an integral tread and sidewall.

BRIEF DESCRIPTION OF THE DRAWINGS

FIG. 1 is a side elevational view of the tire building machine including the extruder.

FIG. 2 is a plan view of the apparatus shown in FIG. 1.

FIG. 3 is an enlarged fragmentary plan view of the strip applying and tensioning means for applying the ribbon or strip to the surface of a green tire carcass.

FIG. 4 is an enlarged fragmentary side elevational view of the strip applying and tensioning means for applying and stitching the ribbon or strip to the surface of the green tire carcass.

FIG. 5 is a diagrammatic showing of the conventional manner in which ribbon or strip stock is applied to the green tire carcass.

FIG. 6 is a diagrammatic showing of the tensioned strip applied to the green tire carcass according to the present invention.

DETAILED DESCRIPTION

Referring to the drawings wherein like reference numerals designate like or corresponding parts throughout the several views, there is shown in FIG. 1 an extruder or strip supplying means 10 mounted on pedestals 11 and 12 interconnected by a frame or platform 13. An extruder motor 14 is suitably connected to a gear box which in turn is connected to the feed screw of the extruder. An extruder die 9 mounted on the discharge end of the barrel of extruder 10 controls the shape of the ribbon 15 as it issues from the extruder in a manner old and well known in the art. The ribbon 15 passes over a roller 16 and thence over a roller 17 journalled on a dancer arm 18 which is pivotally mounted on a support 20 and operates to take up the slack in the ribbon 15 as it passes from the die 14 to the strip applying means or ribbon guide means 22 as shown in FIG. 1. Mounted forwardly of the ribbon or strip applying means 22 is a tire support or building drum 25 suitably journaled on supports 26 and a base 27. Base 27 is suitably supported by a plurality of rollers 29 for pivotally movement about a pivot means 30. The forward portion of such base 27 has a roller cam extending downwardly therefrom and suitably guided in an arcuate cam slot 32 of an arcuately-shaped plate member 33, which plate member 33 is mounted on support frame 34. The outer periphery of plate member 33 has an arcuately-shaped gear sector or rack 36 suitably connected thereto. A spur gear 38 is suitably journaled on the base 27. Spur gear 38 meshes with rack 36 to oscillate the tire building drum 25 upon rotation of such gear 38. Also mounted on base 27 is a motor drive means 39 operatively connected to gear 38 whereby energization of motor drive means 39 operates to rotate gear 38 and thereby pivot the tire support drum 25 and base 27 about pivot 30 for a purpose to be described. Suitably mounted on base 27 is a variable speed motor 40 connected to a shaft for rotating support drum 25 and the green tire T mounted thereon.

As shown in FIG. 4, support 20 and an adjacent support 42 have a horizontally disposed plate 43 connected to the upper portions thereof. A support member 44 is secured to plate 43 and has a bracket 45 connected to the upper portion thereof. Shafts 46 and 47 in bushings 48 and 49 are journaled on bracket 45. Suitably keyed to shaft 46 is an idler roller 50 and sprocket 52. Keyed to shaft 47 is an idler roller 51 and sprocket 53. An adjustable take-up sprocket 55 is journaled in bracket 45 between sprockets 52 and 53 to adjust the tension in a sprocket chain 56 that is trained about sprockets 52 and 53, to thereby interconnect the pair of guide rollers 50 and 51 to assure a positive rotation therebetween when one roller is rotating. The diameter of roller 50 is slightly larger than roller 51 whereby roller 50's peripheral speed is slower than roller 51 which thereby imparts approximately a 5% stretching of the stock material as such material is wound onto the green tire T. Such pair of guide rollers 50 and 51 operate as a ribbon guide means or as a strip applying means in a manner to be more fully described.

Pivotally mounted as at 58 on support member 44 is a moveable support or support means 59. A pneumatic cylinder 60 has its head end pivotally secured to plate 43 and its rod end pivotally connected to one end of a lever member 61, which lever member 61 has its other end secured to support means 59. Pressurization of the head end of cylinder 60 pivots support means 59 in a clockwise direction about pivot 58 as viewed in FIG. 4, to move support means 50 towards the tire casing T. Pressurization of the rod end of cylinder 60 pivots the support member 59 in a counterclockwise direction about pivot means 58 as viewed in FIG. 4, to move the support means 59 away from tire casing T. Suitably mounted on a bracket 62 which is secured to the top portion of support means 59 is a stitching roller 64, which is operative to engage green tire T upon pivoting of support means 59 towards the green tire T. As the tire T and tire support drum 25 rotates, the ribbon 15 is stitched to the tire T and pulls the additional ribbon over the rollers 50 and 51 with a stretch of approximately 5% on the ribbon being effected by the dissimilar diameters of rollers 50 and 51. Roller 51 is of a smaller diameter than roller 50.

In the operation of the described ribbon or strip applying apparatus, the extruder 10 extrudes a flat thin ribbon 15 from die 9, which ribbon passes over rollers 16 and 17 for movement to the ribbon stretching and applying apparatus 22. The ribbon 15 is guided over rollers 50 and 51 for positioning onto the green tire T mounted on the tire support drum 25. Drum 25 is rotated by the energization of motor 40 so that as the ribbon of tread stock is extruded and guided to the green tire T, the rotating green tire T and the drum 25 pull the ribbon over rollers 50 and 51. Since roller 51 is of a smaller diameter than roller 50, the flat ribbon 15 is stretched as it is wound onto the drum effecting a positive adherence to the green tire T and filling the voids completely as shown in FIG. 6 compared to conventional non-stretch placement as disclosed by FIG. 5. As the flat ribbon is wound onto the green tire T, motor 39 is energized to rotate spur gear 38 that meshes with rack 36. As gear 39 rotates it moves the base 27, tire support drum 25 and the green tire T arcuately back and forth about pivot means 30 in a manner old and well known in the art such that enough passes are made until the requisite thickness of tread stock is built up. Limit switches, electronic controls and a template may be used as is known in the art to control the number of passes and the limit of arcuate movement for each pass. See U.S. Pat. Nos. 3,223,572; 3,251,722; and 3,523,854 which structures are incorporated herein by reference.

Various modifications are contemplated and may obviously be resorted to by those skilled in the art without departing from the described invention, as hereinafter defined by the appended claims, as only a preferred embodiment thereof has been disclosed.

I claim:

1. A machine for winding a flat ribbon onto a tire carcass comprising a support frame, a tire building drum for supporting a tire carcass pivotally mounted on said support frame, extruder means for supplying said flat ribbon to said tire building drum, a ribbon guide means located between said extruder and said tire building drum for applying said ribbon to said tire carcass on said drum, means for moving said tire building drum through a predetermined angular oscillation path for applying a plurality of windings of said ribbon on a selected area of said tire carcass from side to side and over the crown of said tire carcass as said ribbon guide means feeds said ribbon from said extruder to said drum, said ribbon guide means includes a pair of spaced guide rollers, one of said rollers applying said ribbon to said tire carcass in said drum, said means for moving said tire building drum through said predetermined angular path cooperative with said one roller applying said ribbon to deposit said flat ribbon in overlapping relationship, a stitching roller mounted on a moveable support, power operated means connected to said moveable support for moving said stitching roller into and out of engagement with said ribbon being applied directly to said drum from said one roller wherein said one roller is rotated thereby, belt means interconnecting said pair of spaced guide rollers to rotate said rollers at the same angular velocity, and said one guide roller is smaller in diameter than the other one of said pair of guide rollers whereby said one guide roller has a greater peripheral speed than said other one of said guide rollers to effect frictional contact over the width of said flat ribbon with the ribbon it overlaps and with the adjacent ribbon or tire carcass eliminating air pockets therebetween as the entire overlap of said flat ribbon is wound onto said tire carcass.

2. An apparatus for applying a flexible rubber-like strip onto a green tire comprising a support frame; a tire building drum pivotally mounted on said support frame, drive means interconnecting said tire building drum to said support frame for pivoting said tire drum back and forth about said pivotal mounting on said support frame, motor means connected to said tire building drum for rotating said drum about its own axis, a strip applying means mounted on said support frame adjacent to said tire building drum, a flexible strip supplying means adjacent to said strip applying means for supplying a thin flat flexible rubber-like strip to said strip applying means for positioning onto a green tire located on said tire building drum, said flexible strip applying means depositing said flat ribbon in overlapping relationship relative to an adjacent flat ribbon, said strip applying means having means for stretching the rubber-like strip prior to application of said flexible strip in overlapping relationship onto the green tire on said tire building drum to place the overlay into frictional contact for its full width to eliminate voids and air pockets, stitching means mounted adjacent to said tire building drum for stitching said strip onto such green tire, said stretching means comprises a pair of idler guide rollers for directing such flexible strip toward said tire building drum, belt means interconnecting said idler rollers to rotate said rollers at the same angular velocity, and one of said idler rollers that is located closer to said tire building drum being smaller in diameter than the remaining one of said pair of idler guide rollers to thereby feed said strip to said tire drum in a stretched condition.

3. An apparatus for applying a flexible rubber-like strip onto a green tire as set forth in claim 2 wherein a dancer roller is mounted on said support frame between said strip applying means and said strip supplying means to deliver untensioned flexible rubber-like strip to said remaining one of said idler guide rollers.

* * * * *